June 1, 1965     W. POTRAFKE     3,186,515

CASHIER'S TABLE FOR SELF-SERVICE STORES

Filed Feb. 26, 1962

United States Patent Office 3,186,515
Patented June 1, 1965

3,186,515
CASHIER'S TABLE FOR SELF-SERVICE STORES
Werner Potrafke, Hufeisenstrasse 6,
Hattingen (Ruhr), Germany
Filed Feb. 26, 1962, Ser. No. 175,580
Claims priority, application Germany, Mar. 2, 1961,
P 26,686
9 Claims. (Cl. 186—1)

The present invention relates to a cashier station for self-service stores. In self-service stores, the customer takes the goods in a portable basket or in a carriage to the cashier who registers the individual items, totals the price and, as the case may be, returns the change. In order to enable the cashier immediately after having registered the price for the goods of one customer to serve the next customer, provision must be made that the goods of the first customer can be transported to a place where the customer can pick up his goods and put the same into a bag while not interfering with the access of the next customer to the cashier. While with a proper design of a cashier station a fast and skillful operation of the cashier may be expected, it has to be taken into consideration that many customers are slow in handing the goods to the cashier, in packing the goods and paying therefor.

Arrangements are known according to which the cashier stations have a plurality of withdrawal compartments which are respectively allotted to the various customers after their purchased goods have been registered and the price therefor has been totalled. These compartments are so arranged that when the customer stands in front of his respective withdrawal compartment, he has left the place where he deposited the goods for registration by the cashier who withdrew the goods from the container in which the customer brought the goods to the cashier station and after registering the goods placed the same into the respective withdrawal compartment for the customer.

It is an object of the present invention to provide an improved cashier's station for self-service stores, which will facilitate a prompt servicing of the respective customer and the transfer of the purchased goods from the depositing station, where the customer deposited the goods for the cashier to be registered, to the withdrawal station.

It is another object of this invention to provide a cashier's station as set forth in the preceding paragraph, which is relatively simple in construction and operation.

Figure 1:
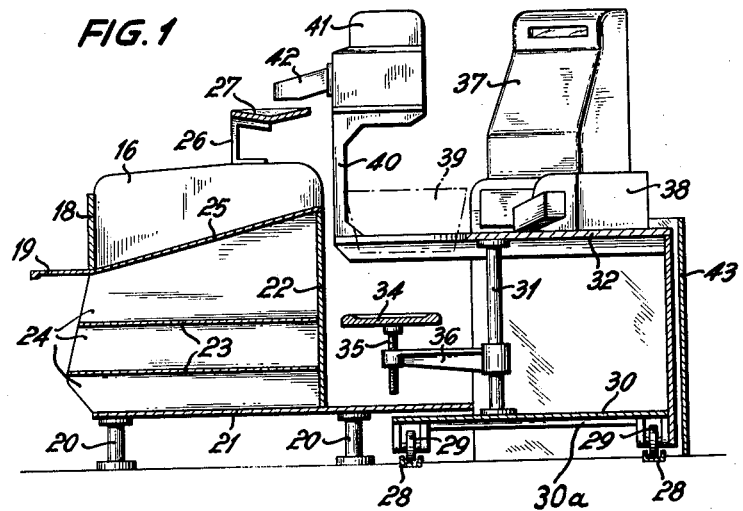

These and other objects and advantages of the invention will appear more clearly from the following specification in connection with the accompanying drawings, in which:

FIG. 1 diagrammatically illustrates a side view and partially a section of a cashier's station according to the invention.

Figure 2:
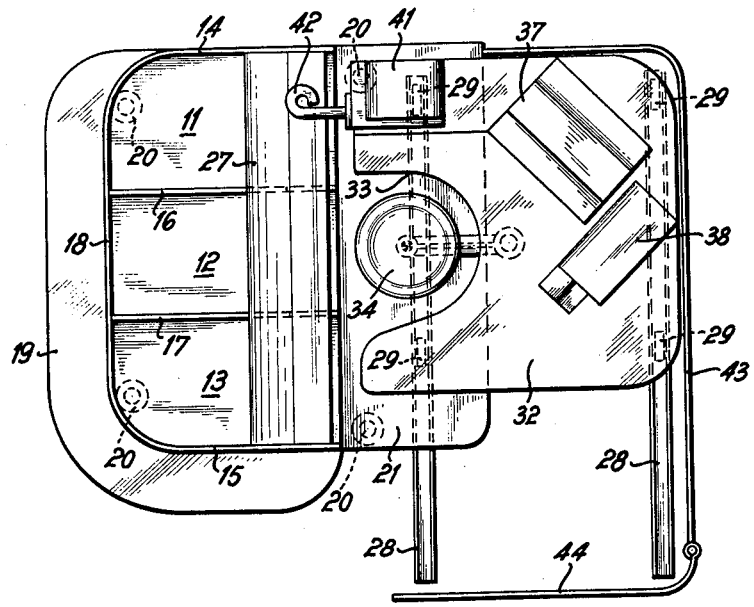

FIG. 2 is a top view of the cashier's station shown in FIG. 1.

The cashier's station according to the present invention comprises, as stated above, a plurality of withdrawal stations into which the cashier places the registered goods of a customer at one side of said compartments and from which the customer withdraws the goods at the other side thereof.

The cashier's station according to the invention is characterized by a carriage supporting the seat of the cashier, the cash register, and a deposit member upon which the customer deposits the purchased goods for registration by the cashier. The said cash register, seat for the cashier, and deposit member are so arranged that a person on said seat can easily reach and operate the cash register and the deposit member. Furthermore, each location or position of the carriage corresponds to the location of one of the compartments so that the cashier can at the same time also easily reach the respective compartment.

The said carriage may also support additional devices and apparatuses, as for instance the change return, discount stamp ejector, etc., which devices and apparatuses are so arranged that they can likewise be easily reached and operated by a cashier on said seat.

The seat supported by said carriage may be a foldable seat or a tiltable seat so that the seat can be folded or tilted out of the way in case the cashier should prefer to stand up rather than to sit on said seat. Of course, if desired, the seat may be omitted altogether and provision may be made merely for a stand for the cashier from which the latter can reach and operate the various apparatuses on the carriage and the withdrawal compartments, while a support may be provided against which the cashier may lean.

Above the said withdrawal compartments there is provided a money strip or chute for receiving the money from the customer and for returning the change to the customer. This money strip or payment strip is arranged parallel to the path of the carriage in such a way that it will be accessible from the discharge side of the withdrawal compartments and also from the seat or stand of the cashier. If the carriage supports a change return, the latter is expediently arranged at such a level that it will be above the withdrawal compartments and that the discharge spout will be above the payment strip so that the change will be discharged through said spout onto said payment strip.

The space ahead of the side from which the goods are placed by the cashier into the withdrawal compartments is confined by a wall serving as cover which wall may be provided with a door for permitting the passage of the cashier and the carriage therethrough.

In many instances the physical effort of the cashier will suffice for moving the carriage back and forth. However, if desired, the carriage may also be provided with a drive operable from the seat or stand of the cashier.

According to the present invention the various apparatuses to be handled by the cashier and the means for receiving the purchased goods to be registered by the cashier and for receiving the registered goods are so located that they will be within easy reach of the cashier when sitting down or standing up so that the cashier's work will be greatly facilitated and speeded up.

Referring now to the drawing in detail, the cashier's stand as shown therein comprises withdrawal compartments 11, 12 and 13, which are confined by the outer walls 14 and 15 and the partitions 16 and 17 and the further outer wall 18. The reference numeral 19 designates a support for the pocket book of the customer, or the like.

The frame work comprising the compartments 11, 12 and 13 rests on columns 20 supporting the base plate 21. The frame work furthermore comprises an inner wall 22 which carries shelves 23. In this way three superimposed compartments 24 are formed in which for instance packing material, such as bags, may be stored. The bottom surface 25 of the withdrawal compartments 11, 12 and 13 is inclined toward the outside so that the goods placed by the cashier into said compartments will slide toward the front of said compartments. The outer walls 14, 15, and partitions 16 and 17 have mounted thereon brackets 26 which support the payment strip or elongated tray 27 for receiving the purchasing money and returning the change.

The arrangement shown in the drawing furthermore comprises rails 28 on which a carriage 30a is displaceable by means of wheels 29. The carriage 30a comprises a base plate 30 having mounted thereon a leg 31 carrying a table plate 32 which is preferably adjustable as to height. On said table plate 32 there are mounted the cash register 37 and the discount stamp ejector 38. The table plate 32 furthermore comprises a place or deposit section on which the customer deposits the basket 39 containing the goods to be purchased. The table plate also supports a bracket 40 which carries the change return device 41 with the discharge spout 42. The table plate 32 is provided with a cutout 33 within which there is provided the cashier's seat 34 which latter by means of a spindle 35 is mounted on an arm 36 adjustably supported by the leg 31 so as to permit adjustment of the seat as to height.

The track for the carriage 30 is surrounded by a skirt 43 extending approximately down to the floor. The front wall 44 of said skirt 43 is foldable by means of a hinge.

The operation of the cashier's station as shown in the drawing may be carried out in the following manner. The cashier first moves the carriage far enough so as to be able to sit down on the seat 34 and then moves the carriage into a position from which the cashier can service the customer who has deposited a basket 39 with goods to be purchased on the place of the table plate 32 provided therefor. The cashier then asks the customer to proceed to one of the withdrawal compartments 11, 12 or 13. In the meantime, the cashier registers one item after the other in the cash register 37 and places the respective registered items into the corresponding allotted withdrawal compartment. In the meantime the cashier has moved herself into a position from which the respective withdrawal compartment can be reached easily. After all goods to be purchased by the respective customer have been registered and the price therefor has been totalled, and after the items have been placed into the respective withdrawal compartment, the customer puts the purchasing money upon the payment strip or tray 27 from where the cashier withraws the money, whereupon she causes the change return device, as the case may be, to place the change onto the payment strip or tray 27. The cashier then may service the next customer while the serviced customer will have sufficient time to withdraw the change, check the same and to withdraw the purchased goods from the respective compartment and place said goods into bags.

The new cashier's station is of a particularly short length and is composed of very simple structural elements.

It is, of course, to be understood that the present invention is by no means limited to the particular construction shown in the drawing but also comprises any modifications within the scope of the appended claims. Thus, while the drawing shows only three withdrawal compartments, the number of said compartments may be considerably increased.

What I claim is:

1. A cashier's station including a cash register for self-service stores, which comprises in combination: a plurality of withdrawal compartments substantially rectangular when viewed from above and in side by side relation for receiving purchased goods after the price of the latter has been registered by said cash register, each of said compartments having a charging side on the side toward the cash register at which the purchased goods are placed into the respective compartment and also having a withdrawal side on the side remote from the cash register at which the customer withdraws the goods purchased by the customer, the charging sides of said compartments being in a common plane and the longitudinal axes of said compartments being parallel, non rotatable table means supporting said cash register, said table means also including a depositing section for receiving the goods selected by the customer prior to the registration of the price of said goods by said cash register, a seat between the table and said withdrawal compartments, a carriage supporting said table means and said seat, and means supporting said carriage for movement selectively transversely in a straight line with regard to the longitudinal axes of said compartments into a plurality of positions from each of which said cash register and said depositing section and the charging side of at least one of said compartments are within easy reach of a person on said seat.

2. A cashier's station according to claim 1, in which said table means has also mounted thereon a change return device and a discount stamp ejector, said change return device and said discount stamp ejector being within easy reach of a person on said seat.

3. A cashier's station including a cash register for self-service stores, which comprises in combination: a plurality of withdrawal compartments substantially rectangular when viewed from above and in side by side relation for receiving purchased goods after the price of the latter has been registered by said cash register, each of said compartments having a charging side on the side toward the cash register at which the purchased goods are placed into the respective compartment and also having a withdrawal side on the side remote from the cash register at which the customer withdraws the goods purchased by the customer, table means supporting said cash register, the charging sides of said compartments being in a common plane and the longitudinal axes of said compartments being parallel, non rotatable table means also including a depositing section for receiving the goods selected by the customer prior to the registration of the price of said goods by said cash register, a cashier's stand between said table and said withdrawal compartments a carriage supporting said table means and said stand, and means supporting said carriage for movement thereof transversely and in a straight line with regard to the longitudinal axes of said compartments selectively into any one of a plurality of positions from each of which said cash register and said depositing section and the charging side of at least one of said compartments are within easy reach of a person on said stand.

4. A cashier's station according to claim 3, in which said compartments have bottom walls which slope downwardly from the charging side to the withdrawal side so the goods will slide therein toward the said withdrawal side.

5. A cashier's station including a cash register for self-service stores, which comprises in combination: a plurality of withdrawal compartments substantially rectangular when viewed from above and in side by side relation for receiving purchased goods after the price of the latter has been registered by said cash register, each of said compartments having a charging side on the side toward said cash register at which the purchased goods are placed into the respective compartment and also having a withdrawal side on the side thereof remote from said cash register at which the customer withdraws the goods purchased by the customer, the charging sides of said compartments being in a common plane and the longitudinal axes of said compartments being parallel, non rotatable table means supporting said cash register, said table means also including a depositing section for receiving the goods selected by the customer prior to the registration of the price of said goods by said cash register, a cashier's stand between said table means and said withdrawal compartments, straight track means extending substantially transversely with regard to the longitudinal axes of said compartments, a carriage supporting said table means and said stand, and displaceably mounted on said track means so as to be movable in a straight line substantially transversely with regard to the longitudinal axes of said compartments selectively into any one of a plurality of positions from each of which said cash register and said depositing section and the charging side of at least one of said compartments is within easy reach of a person on said stand, and money-tray means extending substantially parallel to said track means and above said compartments and within the reach of a person at said withdrawal side of said compartments and also within easy reach of a person at the charging side of said compartments for receiving money placed on said money-tray means from said charging side and said withdrawal side.

6. A cashier's station according to claim 5, which includes a change return device provided with a spout arranged above said money-tray means.

7. A cashier's station including a cash register for self-service stores, which comprises in combination: a plurality of withdrawal compartments substantially rectangular when viewed from above and in side by side relation for receiving purchased goods after the price of the latter has been registered by said cash register, each of said compartments having a charging side on the side toward the cash register at which the purchased goods are placed into the respective compartment and also having a withdrawal side on the side remote from the cash register at which the customer withdraws the goods purchased by the customer, the charging sides of said compartments being in a common plane and the longitudinal axes of said compartments being parallel, non rotatable table means supporting said cash register, said table means also including a depositing section for receiving the goods selected by the customer prior to the registration of the price of said goods by said cash register, a cashier's stand between said table and said withdrawal compartments, straight track means extending substantially transversely with regard to the longitudinal axes of said compartments, a carriage supporting said table means and said stand and displaceably mounted on said track means so as to be movable in a straight line substantially transversely with regard to the longitudinal axes of said compartments selectively into any one of a plurality of positions from each of which said cash register and said depositing section and at least the charging side of one of said compartments is within easy reach of a person on said stand, money-tray means extending substantially parallel to said track means and above said compartments and within the reach of a person at said withdrawal side of said compartments and also within easy reach of a person at the charging side of said compartments for receiving money placed on said money-tray means from said charging side and said withdrawal side, and wall means confining that portion of said cashier's station which is located on said side of said compartments which is opposite the withdrawing side thereof and where said carriage is movable.

8. A cashier's station according to claim 7, in which said wall means is provided with a door for the passage of said carriage.

9. A cashier's station including a cash register for self-service stores, which comprises in combination: a plurality of withdrawal compartments substantially rectangular when viewed from above and in side by side relation for receiving purchased goods after the price of the latter has been registered by said cash register, each of said compartments having a charging side on the side toward the cash register at which the purchased goods are placed into the respective compartment and also having a withdrawal side on the side remote from the cash register at which the customer withdraws the goods purchased by the customer, the charging sides of said compartments being in a common plane and the longitudinal axes of said compartments being parallel, non rotatable table means supporting said cash register, said table means also including a depositing section for receiving the goods selected by the customer prior to the registration of the price of said goods by said cash register, a cashier's stand between said table and said withdrawal compartments, a carriage supporting said table means and said stand, said carriage being movable in a straight line transversely with regard to the longitudinal axes of said compartments selectively into any one of a plurality of positions from each of which said cash register and said depositing section and at least the charging side of one of said compartments are within easy reach of a person on said stand, and means operatively connected to said carriage and operable from the inside of said cashier's station for actuating said carriage.

References Cited by the Examiner

UNITED STATES PATENTS

| 2,552,434 | 5/51 | Klapman. | |
| 2,560,490 | 7/51 | Smith | 186—1.1 X |
| 2,569,711 | 10/51 | Foster | 186—1.1 X |
| 2,723,728 | 11/55 | Crawford | 186—1.1 |
| 3,094,191 | 6/63 | Potrafke | 186—1 |

FOREIGN PATENTS 796,024 6/58 Great Britain.

LOUIS J. DEMBO, *Primary Examiner.*

KARL J. ALBRECHT, SAMUEL F. COLEMAN,
*Examiners.*